United States Patent [19]
Bachmann et al.

[11] 4,050,353
[45] Sept. 27, 1977

[54] INDEX GENERATION METHOD AND MACHINE FOR PRODUCTION OF BEVEL GEARS

[75] Inventors: Lothar Bachmann; Karl-Heinz Engemann, Karl-Marx-Stadt, Germany

[73] Assignee: Veb Werkzeugmaschinenkombinat "7.Oktober, Karl-Marx-Stadt, Germany

[21] Appl. No.: 585,169

[22] Filed: June 9, 1975

Related U.S. Application Data

[63] Continuation-in-part of Ser. No. 433,626, Jan. 16, 1975, abandoned.

[51] Int. Cl.² .................................................. B23F 9/10
[52] U.S. Cl. ................................................................ 90/5
[58] Field of Search ............................. 90/3, 4, 5, 6

[56] References Cited

U.S. PATENT DOCUMENTS

| 2,667,818 | 2/1954 | Stewart et al. | 90/5 |
| 3,440,927 | 4/1969 | Snook | 90/5 |
| 3,464,312 | 9/1969 | Takahashi et al. | 90/5 |

*Primary Examiner*—Gil Weidenfeld
*Attorney, Agent, or Firm*—Nolte and Nolte

[57] ABSTRACT

Pitch generation method for the production of bevel gears and mainly for the rough hobbing of pinions, with working of the pinion blank during generating of the tooth profiles, using a single cutter head for working both flanks of each tooth space. The generating speeds and ratio of roll of the cutter head, as well as the profile angle of the cutters are kept uniform. The desired, curved outlines of the tooth flanks, establishing a tapering tooth space, are generated by a simple mechanism which generates the proper motions of the gear cutters. For this purpose the cutter head is pivoted, opposite the workpiece or gear blank, in a drum, for several swiveling motions.

15 Claims, 17 Drawing Figures

INDEX GENERATION METHOD AND MACHINE FOR PRODUCTION OF BEVEL GEARS

PRIOR APPLICATION

This is a continuation-in-part of application Ser. No. 433,626, filed Jan. 16, 1975, now abandoned.

BACKGROUND AND NATURE OF THE INVENTION

It has been usual to produce bevel gears with tapering tooth spaces and particularly to carry out the hob roughing of pinions, with fair accuracy of the profile generated by the hob roughing and with corresponding simplification of the final smoothing, offsetting operation, by generating a tool in one direction, which may be called forward to form one of the tooth flanks and then generating the tool in the reverse direction, which may be called rearward to form the opposite tool flank. In a recent development, the attempt has been made to achieve this by shifting the cutter head radially to the axis of its cradle. The radial shift produced the counter profile required for the tapering tooth space. The travel of the cutters about the axis which also travels through an arc because of its displacement is called rolling; and because usually the tool (cutters) and workpiece are arranged for confrontation in vertical planes, the relative motions between the two are sometimes referred to as upward and downward.

This prior attempt was generally successful but required very considerable time. The reason is that the radial shifting of the cutter head relative to the cradle axis, between the forward and backward generating, caused the cutter, which was rotating about the other axis of the knife head, to generate a circular arc positioned at considerable variance from the theoretically required profile of the flank; therefore, it was only possible to operate with cutter points of little breadth and, accordingly, with small generating feed. For the same reason this prior method did not generate truly accurate tooth profiles of proper form according to the predetermined mesh kinematics. Nevertheless, the machine required very complicated construction, which additionally interfered with rapid radial shifting of the cutter head.

Therefore, and mainly in order to reduce the working time, a new method was developed, heretofore. Reference may be made to U.S. Pat. No. 2,725,792 to Wildhaber, assignor to the Gleason works, issued Dec. 6, 1955. Both flanks of a tooth space were generated with one and the same cutter head; cutters and workpiece rolled relative to one another, first in one and then in the other direction; and the desired tapering of the tooth spaces in one direction was achieved by using different proportions of transmission for the generating motion in the one and other direction. In order to generate both tooth flanks with approximately the desired contact angles, spaced blade cutter heads were used, increasing and decreasing the profile angles between the forward and backward generating. A special mechanism of course was necessary for this purpose.

In addition, some further substantial problems were encountered. The use of spread blade cutter heads did not totally compensate for the change of the working angle produced by the changing ratio of roll. Also, when the angles of obliquity were small or particularly zero, accurate meshing of the bevel gears was not achieved, although the machine was very complicated, because of the kinematics required for generating the additional modifications of motions.

The invention further reduces the time required for performance of the various motions in the machine and the cost thereof, while it adds to the accuracy of the generated tooth profile with tapering tooth space. It achieves this by eliminating the change of rolling conditions and corresponding correction of profile angles of spread blade cutters, particularly for the hob roughing of the teeth space of outwardly increasing width, by the use of a very short train of drives for the generating and by omitting provision for introduction of additional drive elements, performing additional motions.

More specifically, the object is achieved with the use of a spread blade cutter head revolving about a first position of its axis for forward generating and hobbing of one tooth flank; subsequent swiveling of the expanding cutter head about a swivel axis by a certain center offset angle to provide a new position of the cutter head axis; and subsequent circulation of the cutter head, at the same ratio of roll, to generate the other tooth flank of the tooth space, by revolving about the newly positioned axis.

Figure 1:
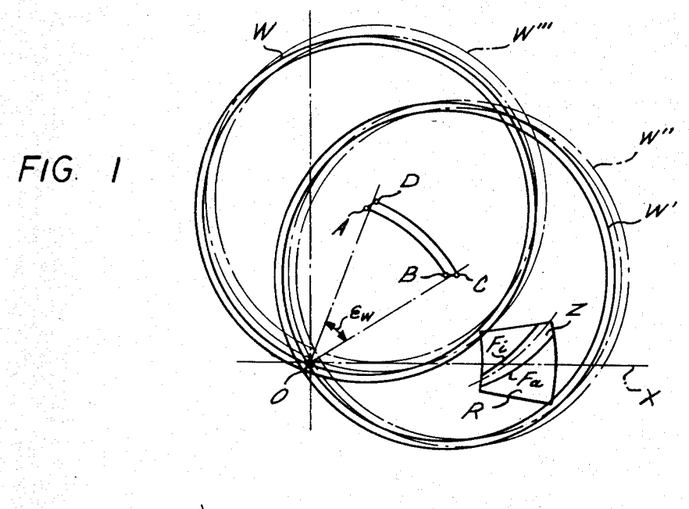
FIG. 1 is a schematic representation indicating limits of motion in the new pitch generating method.

At the inception of the forward generating operation, the axis of motion of the spread blade cutter head W (FIGS. 4, 5) is in the position shown at A in FIG. 1. Forward generating is performed about a cradle axis progressing from A to B, about a roll angle $\epsilon_w$. When the axis of the cutter head is in position B, the head is in the new position W'. On the way from W to W' the cutters have cut the convex, inner flank $Fi$ on pinion R, which pinion is partly shown in FIG. 1.

Figure 2:
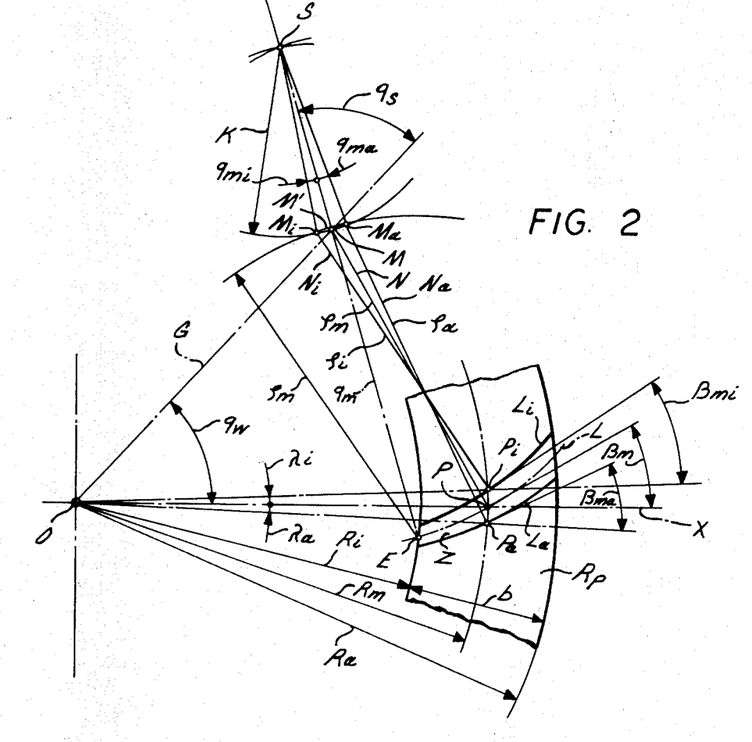
FIG. 2 shows a detail from FIG. 1 on a larger scale and with additional details.

For the subsequent backward generating the cutter head W' is subjected to a swiveling motion about a swivel axis S. This axis, as shown in FIG. 2, intersects the line between the swivel angles $q_{Mi}$ and $q_{Ma}$. As indicated in FIG. 1, this brings the cutter head axis from B to C, and brings the cutter head itself from position W' to position W''. Upon backward generating, the axis is at D and the cutter head at W'''. During this backward generating, it has generated the concave, outer flank Fa.

Figure 1A:
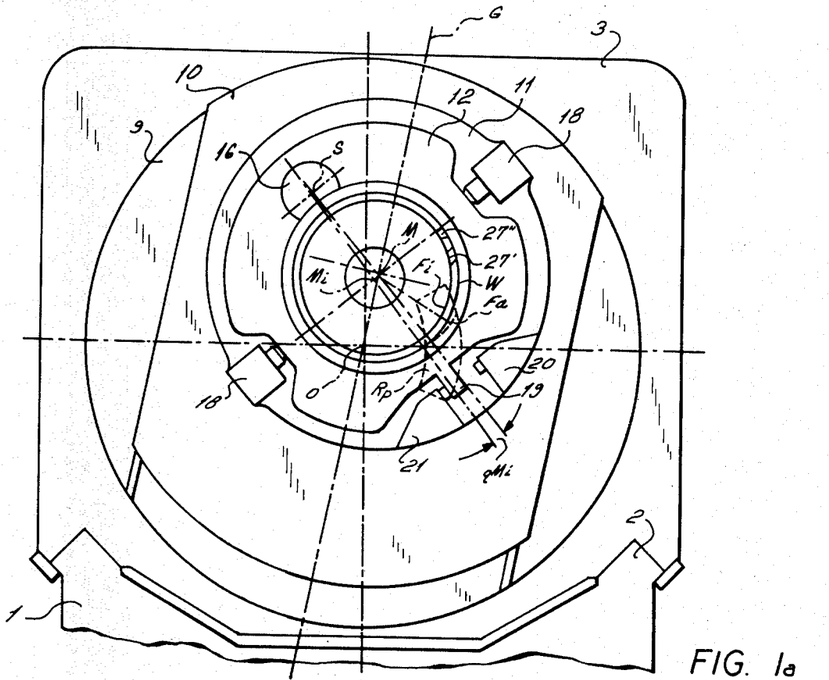
FIGS. 1a to 1d are partly schematic illustrations of the sequence of movements in the cooperation of the cutter head and the workpiece during the manufacturing of a crown gear in the present invention.
Figure 1B:
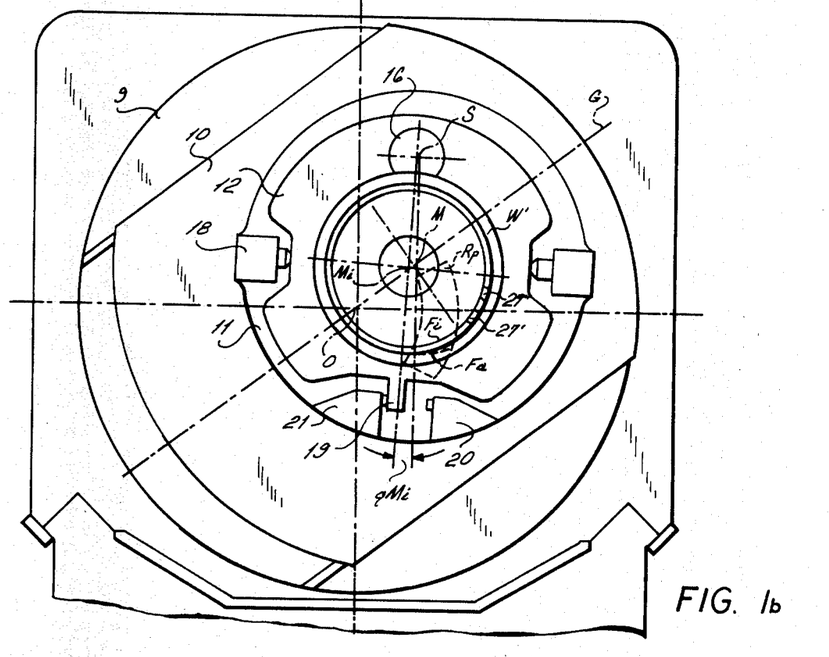
Figure 1C:
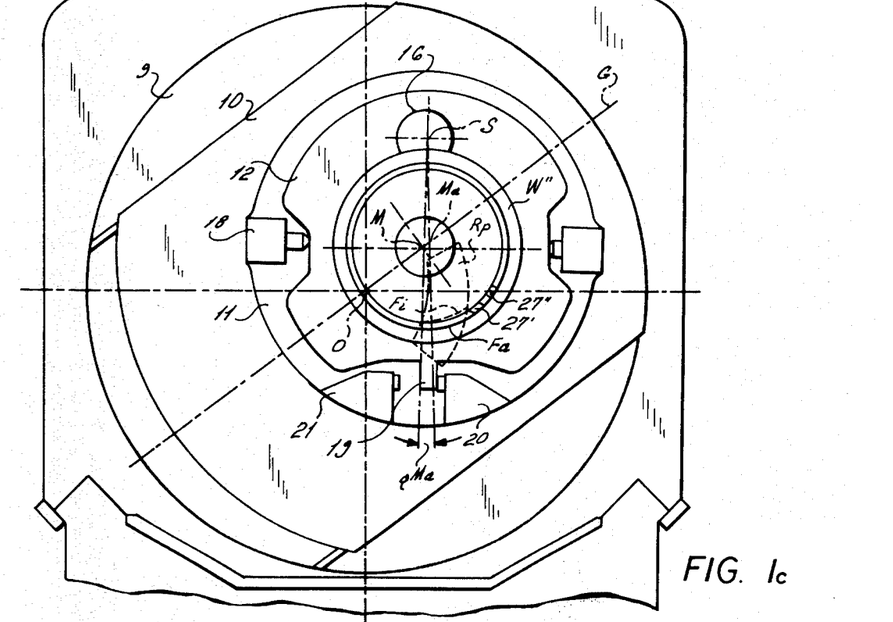

FIGS. 1a to 1c illustrate the various stages of the above described sequence of movements, the schematic representation of the cutter head W and of the part of a crown wheel $R_p$ illustrating the cooperation of tool and workpiece during the manufacturing process. In order to simplify the description of the technical relations, only those parts of the device are shown in FIGS. 1a to 1d the representation of which is necessary for the understanding of the machining operation.

FIG. 1a shows the cutter head W and the device the adjustment of which will be described later in the position designated A in FIG. 1.

In this position, the cutter head W circles about the cutter axis Mi, which in turn moves during the forward rolling from the starting position A to the rolling end position B about the cradle axis O, namely by the amount of the rolling angle $\epsilon_w$ shown in FIG. 1.

As can be seen clearly from FIGS. 1a and 1b, the major part of the material of the tooth gap Z to be milled is worked out during the forward rolling, the convex flank Fi already receiving its final form. The cutters 27' and 27'', indicated schematically on the cutter head W, intersect in alternating succession the left and right teeth flanks of the tooth gap Z. After the forward rolling is completed, only the convex flank Fi machined by the cutters 27' has received its theoretically predetermined form, while the concave flank Fa, indicated by broken lines, is only partly worked out by the cutters 27''. FIG. 1b shows the cutter head W together with other parts of the device in the position which is designated with B in FIG. 1, and which represents the rolling end position for forward rolling. In the rolling end position B, the cutter head W is designated W'.

FIG. 1b shows that the above mentioned pivoted movement of the cutter head axis Mi about the cradle axis O was effected by turning the cradle 9, so that the radial slide 10, the swivel drum 11, the swivel part 12 and thus the cutter head W were turned.

Since the gearing process takes place, as known, on the basis of a rolling movement between tool and workpiece, the pinion R, illustrated in FIGS. 1a to 1d by a part of the crown gear $R_p$, was turned by a corresponding amount about its axis in dependence on the pivotal movement of the cutter head W. The resulting new position of the tooth gap Z to be machined is shown in FIG. 1b.

In the rolling end position B, the swivel part 12 carrying the expanding cutter head W' is turned about a swivel axis S by means to be described later, namely by the amount of the angles $qMi + qMa$, so that the cutter head W' is brought into the position designated C in FIG. 1. In this position, which is shown in FIG. 1c, the cutter head is designated W'' and circles about the cutter head axis Ma (see also FIG. 2). The pivotal movement of the swivel part 12, and thus of the cutter head W', about the swivel axis S causes the two circular tracks of the cutters 27'' to coincide with the concave flank Fa as can be seen clearly from FIG. 1c. This new position, which the tool and the workpiece assume relative to each other, has the result that the residue of material remaining on the flank Fa is removed by the cutters 27'' during the backward rolling and the taper of the tooth gap Z is thus formed. Beyond that, FIG. 1c shows that no metal is removed anymore by the cutters 27', since the convex flank Fi was brought out of the range of action of the cutters 27' by the pivotal movement of the cutter head W' about the swivel axis S.

Figure 1D:
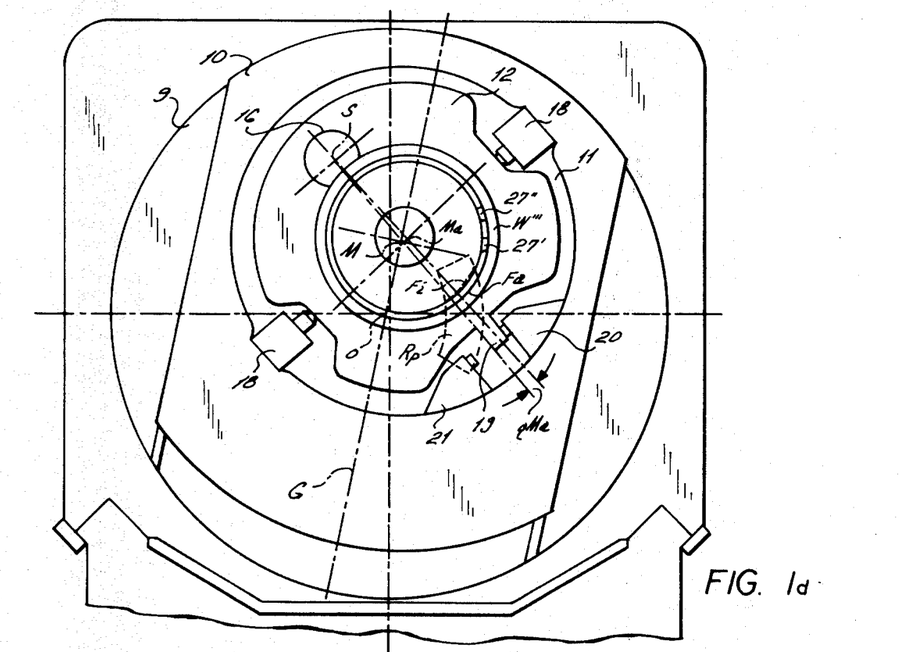

The backward rolling is completed when the cutter head axis Ma and thus the cutter head W'' have reached the position designated D in FIG. 1. In the rolling end position D, which is shown in FIG. 1d the expanding cutter head is designated W'''. In this position the swivel part 12, and thus the cutter head W''' with the cutter head axis Ma, is turned by means to be described below about the swivel axis S back into the starting position A shown in FIG. 1a, namely again by the amount of the angles $qMa + qMi$. On this pivotal movement into the starting position A, in which the cutter head is again designated W and circles about the cutter head axis Mi, at the same time the indexing movement for the pinion R is superposed so that the starting position has been reached for the manufacture of the next tooth gap Z.

Figure 8:
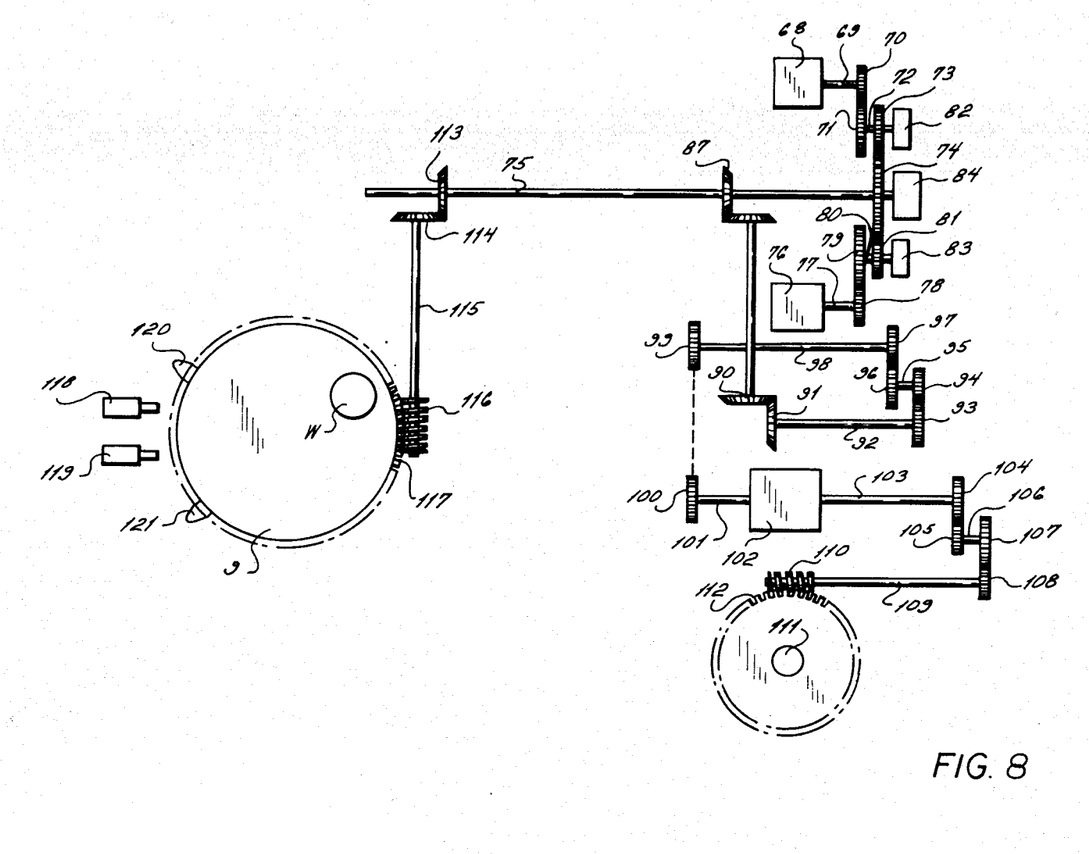
FIG. 8 is a schematic representation of the linkages for effecting the aforementioned rolling of the cutters and the workpiece relative to each other.

The linkages for forward rolling and backward rolling can be seen clearly from FIG. 8 and the corresponding description.

FIG. 2 shows the geometrical basis for the pitch generating method, in a calculating plane, for constant height of the teeth. Concentrically about cradle axis O a segment of a gear is indicated as being subject to roughing hob operation, this segment Rp being shown with a planar work surface, for simplicity of the showing of the new geometry according to this invention. It will be possible for persons skilled in the art to visualize how the inner cone distance Ri, mean cone distance Rm and outer cone distance Ra of a plane surface can become the corresponding radii of a bevelled gear surface. As indicated, the tooth surface has a width of b. Tooth space Z extends across the indicated segment, and is formed in accordance with the invention, under the geometrical relationships in accordance therewith, as described hereinafter.

Momentary axis X for the tooth generating process intersects the axis O of gear blank $R_p$ and of the cradle, and also intersects the pitch side of the mean cone distance Rm, at point P. For geometrical construction of the desired motion, one-half of the desired tooth space angle ($\lambda i$), is marked on one side of momentary axis X, and the other one-half of the desired tooth space angle ($\lambda a$) is marked on the other side thereof, so that the marked lines intersect the pitch circle at calculating points Pi and Pa. The desired average angle of skew, $\beta_m$ is marked at P. The corresponding skew angles $\beta_{mi}$ and $\beta_{ma}$, of the arcs Li, La, corresponding respectively to the convex and concave flanks Fi and Fa (FIG. 1) are marked in points Pi and Pa, respectively, on the outlines of these angles. Respective normals Ni and Na are erected, in Pi, Pa respectively, on both sides of a central normal N. The average radius $\rho_m$ of the cutter head is applied to normal N, from intersection P, and the same radius is used to construct a circular arc L about the end point M' of the first mentioned radius. Another circle of radius $\rho_m$ is constructed about the intersection of the circular arc L with the inner cone distance Ri (or, if outward tapering of the tooth space is desired, a point corresponding to E is obtained by a corresponding construction relative to the outer cone distance Ra).

The circular arc of the average cutter head radius $\rho_m$ is so constructed, about intersection E, as to find inner and outer cutter head axes Mi and Ma for performance of the operation. A circular arc about axis Mi, with radius $\rho_i$, produces the tooth flank profile line Li for the convex flank Fi; correspondingly the concave flank Fa is found.

Thereupon, swivel axis S (for the swiveling of the cutter head from W' to W" and thereafter back from W'" to W in FIG. 1) is found by constructing a circular arc with swivel radius K about the indicated cutter head axes M$i$ and M$a$, as indicated in the upper part of FIG. 2. Up to here the geometry has been traced under the assumption that radius $\rho_m$ is predetermined. Correspondingly, for practical realization of the operation, the two positions of the cutter head axes, M$i$ and M$a$, can be found by constructing a circular arc with radius K, which intersects the circle of radius $\rho_m$ at M$i$ and M$a$. The circular arc with swivel radius K, about swivel axis S also has thereon the theoretical initial position of the cutter head axis M, between the positions M$i$ and M$a$. Swiveling of axis M from its original position into positions M$i$ and M$a$ yields the two offset angles $q_{mi}$ and $q_{ma}$. These two angles are necessarily symmetrical about axis M. Practically, the initial position of the cutter head axis M coincides with axis M" of the swiveling drum. On a straight line G the distance OM is the eccentricity of the cutter head, shown in FIG. 5 as $e$. Line G is to form a cradle angle $q_w$ with the momentary axis X, and to form predetermined swivel angle $q_s$ with the straight line MS in FIG. 2.

Figure 3:
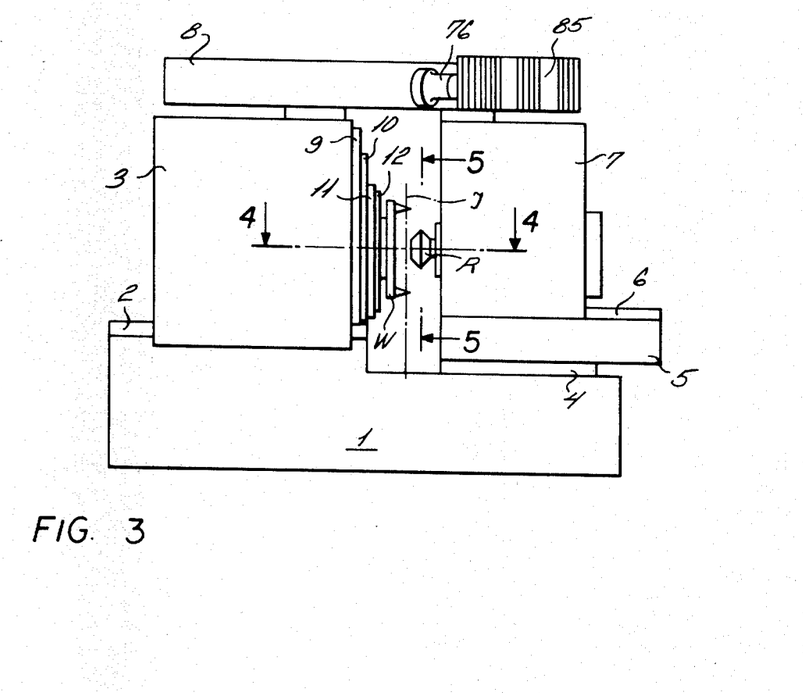
FIGS. 3 and 3a are side views generally showing the new machine.
Figure 3A:
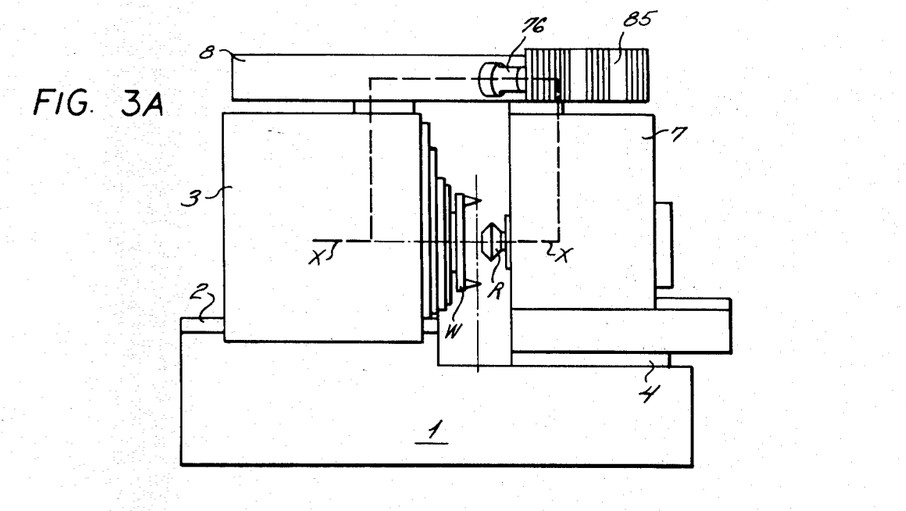

FIGS. 3, 3$a$ and 3$b$ show the basic construction of a machine for performing the operation according to the invention and complying with the geometry set forth above; FIG. 4 shows the most important parts according to the invention on a larger scale and FIG. 5 shows them in a position corresponding to FIGS. 1 and 2.

A machine bed 1 has, at one end thereof, guide means 2 for horizontal shifting motion of tool holder 3. Opposite this holder, bed 1 has guide means 4 for horizontal shifting of pinion blank R about a vertical center line J in accordance with the angularity of the bevel surface of the blank. Guide means 4 may for example provide for horizontal shifting motion of a head 5, which in turn has a straight horizontal guide 6 on its top for shifting of a workpiece holder 7. This latter holder is connected with tool holder 3 by a traverse 8, for corresponding motions of major axes X, X therein, as generally indicated in FIG. 3$a$ these motions being known to persons skilled in the art and being believed not to require detailed description, beyond the indication of this figure.

Figure 4:
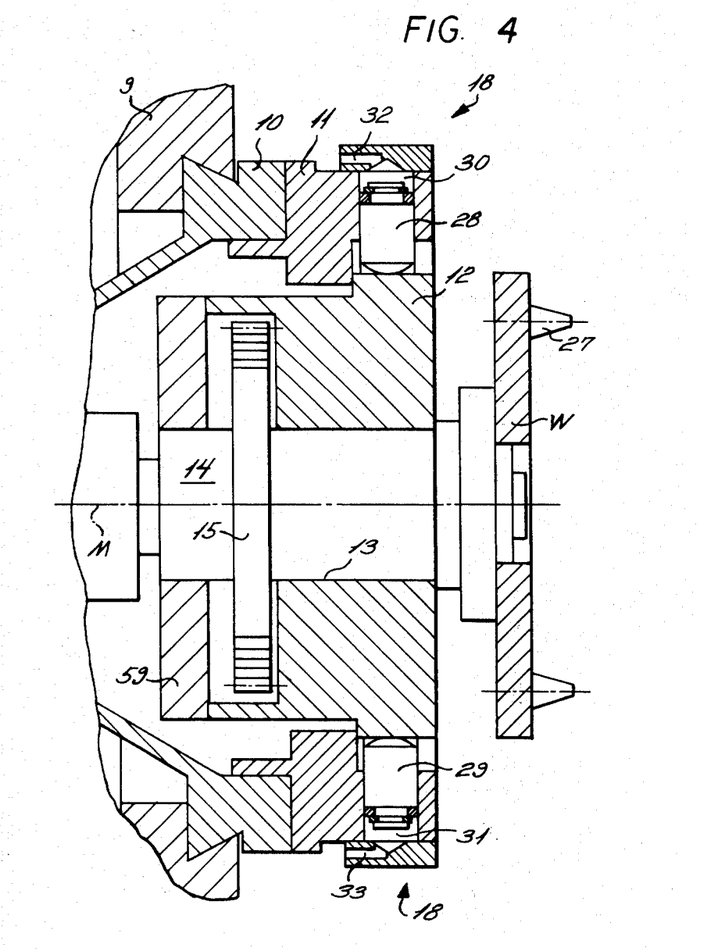
FIG. 4 is a sectional view taken generally along line 4—4 in FIG. 3.
Figure 5:
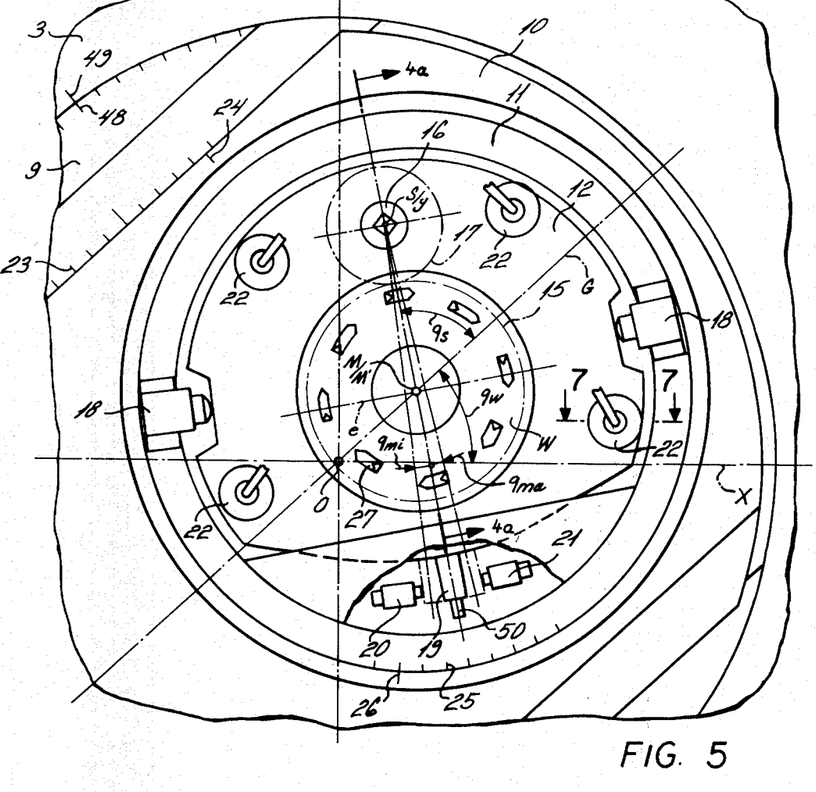
FIG. 5 is a view taken generally along lines 5—5 in FIG. 3, when the cutter head is in its middle position.

According to the invention, tool holder 3 has a cradle 9 therein with guide means thereon for motion of slide 10 radially of the cradle, as generally best indicated in FIGS. 4 and 5. Slide 10 carries swivel drum 11 which contains swiveling part 12, swivelable about the aforementioned swivel axis S (FIG. 2). The cutter head W is rotatably positioned in the swivelable part 12 as also best indicated in FIG. 5.

FIG. 4 shows a preferred construction of cradle 9, radial slide 10, swivel drum 11 and swiveling part 12 with cutter head W thereon. This part 12 has inner bearing surface 13 for rotating cutter head spindle 14 therein. For driving the cutter head, a gear 15 is rigidly concentrically secured to spindle 14.

Figure 4A:
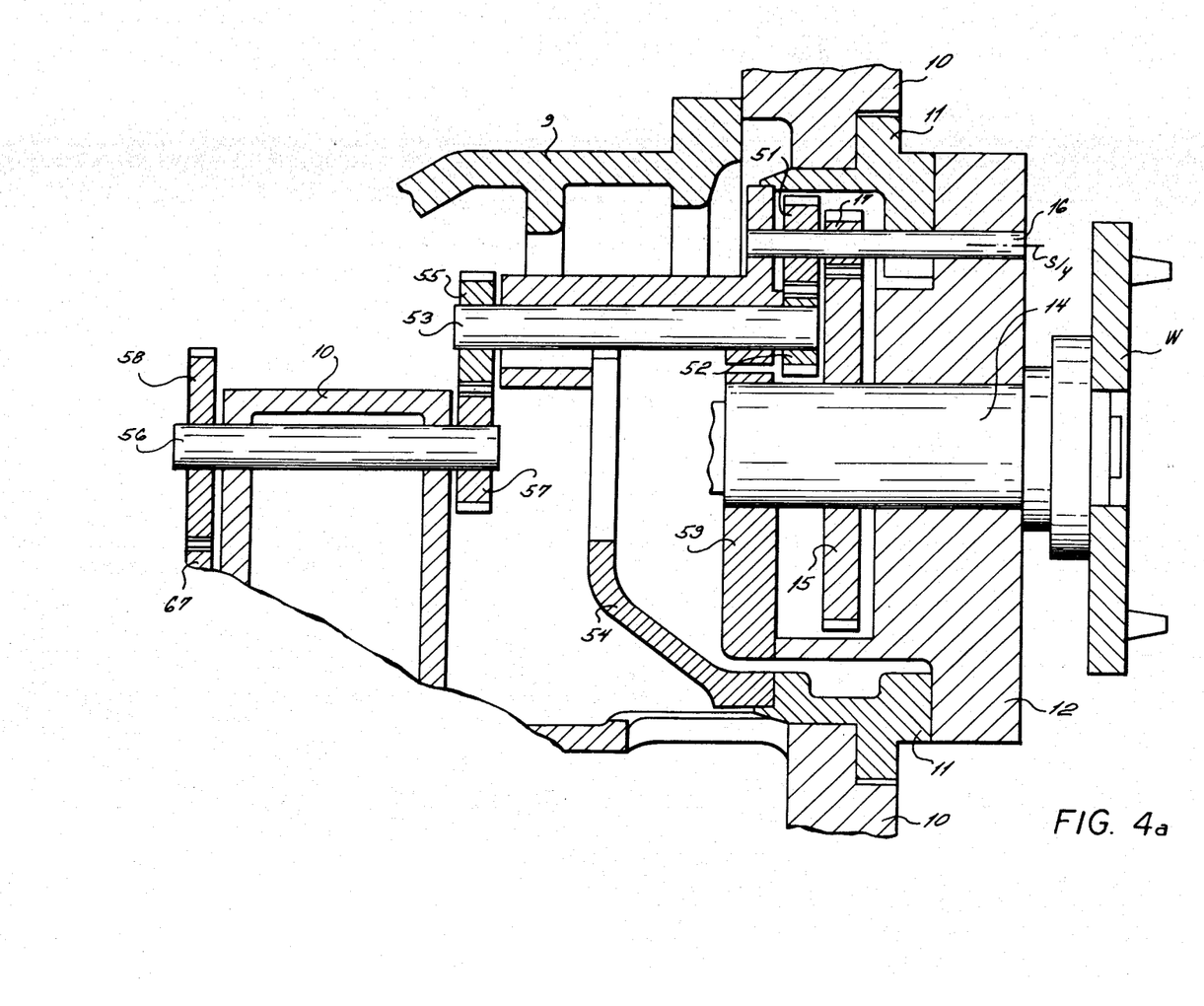
FIG. 4a is a schematic sectional view taken along line 4a—4a in FIG. 5.

In accordance with the invention, swivelable part 12 is disposed in drum 11 for swiveling about axis S, which coincides with axis Y of shaft 16 of drive pinion 17 for driving the cutter head, this pinion being in mesh with the aforementioned gear 15 (FIGS. 4$a$ and 5).

According to FIG. 4$a$, a gear 51 is arranged on the shaft 16, which in turn meshes with a gear 52. The gear 52 is received by a shaft 53 which is mounted in a cover 54 rigidly connected to the swivel drum 11. On the shaft 53 is arranged beyond that an additional gear 55 which meshes with a gear 57 arranged on a shaft 56. The shaft 56 is received by a radial slide 10 and carries a loose gear 58. A cover 59 closes the swivel part 12 to the rear and forms at the same time the second bearing for the cutter head spindle 14.

FIG. 4$a$ is a schematic representation for simplicity's sake. Of course, the machine parts shown there are designed according to modern construction principles and are guided by corresponding machine elements, taking into account their function.

Figure 4B:
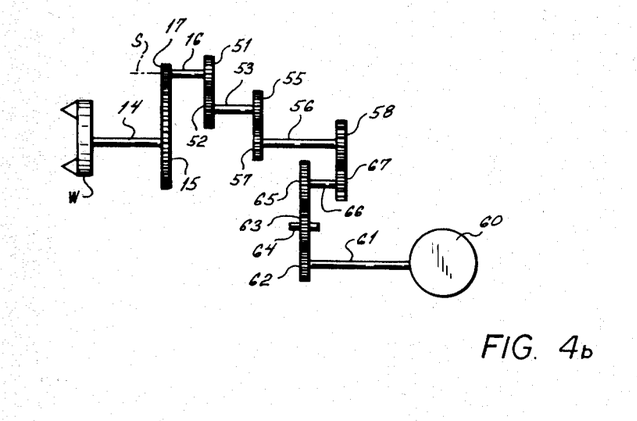
FIG. 4b is a schematic representation of the linkages for driving the cutter head W.

In FIG. 4$b$, the drive train is from the driving motor 60 over shaft 61, the pair of gear wheels 62, 63, shaft 64, gear wheel 65, shaft 66 to gear 67, which transmits the rotary movement to the loose gear 58 shown in FIG. 4$a$. The driving motor 60 and the above mentioned machine elements 60 to 67, as well as 56, 57 and 58 are arranged in and associated with the radial slide 10. From loose gear 58 the driving runs, as can be seen from FIG. 4$a$, to shaft 56 and passes over the pair of gears 57, 55, shaft 53, pair of gears 52, 51, shaft 16, and pair of gears 17, 15 to the cutter head spindle 14.

For the aforementioned swiveling of head W, part 12 has swiveling pusher devices 18 on drum 11. Proper limitation of the radial swiveling of part 12, about its axis M, is provided by device 19, 20, 21, comprising a stationary stop 19 between two adjustable abutments 20, 21, also on drum 11. Swiveling part 12 thus is properly shiftable on drum 11; and it is subject to fastening to the drum, in its different positions, by clamping devices 22. For adjustment of the eccentricity $e$ for the middle or starting position of cutter head axis M, by part 18, cradle 9 has a scale 23 thereon, with a null mark 24 on radial shifter 10 opposite this scale. Additionally, for adjustment of the rocking angle $q_r$ a scale 25 is provided on swivel drum 12, opposite null mark 26 on radial shifter 10. FIG. 5 shows expanding cutter head W, with cutters 27 fastened thereto, in the initial position of its axis M.

Swiveling pusher device 18 is shown in FIG. 4 as comprising two hydraulic pistons 28, 29, disposed in hydraulic cylinders 30, 31, which are secured directly to swivel drum 11. Hydraulic oil from a suitable source S', FIG. 7$a$, reaches the cylinders through ducts 32, 33.

Figure 6:
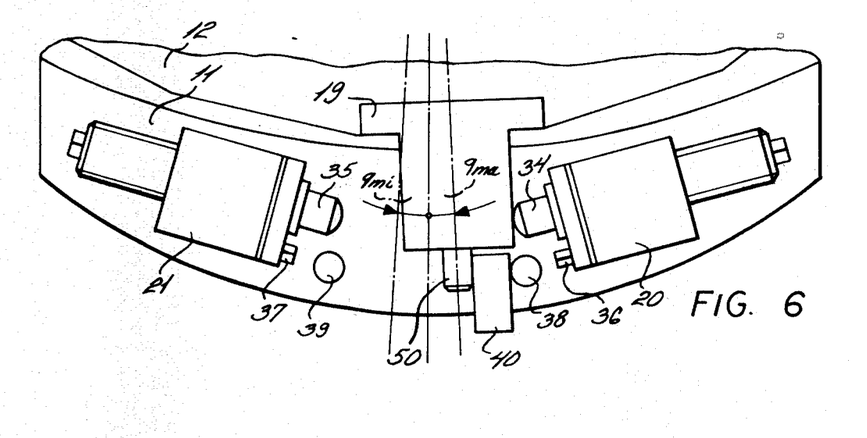
FIG. 6 is a view showing a detail of FIG. 5 on a larger scale.

As shown in FIG. 6, the adjustable stops 20, 21 opposite the fixed stop 19 on swiveling part 12, have threaded shafts 34, 35 which can be fastened by clamping devices 36, 37. For accurate adjustment of the center offset angle $q_{Mi}$ and $q_{Ma}$ fixed stop 19 has measuring bolts 38, 39 combined therewith and fastened to swivel drum 11. A block gauge 40 can be inserted between either bolt 38, 39 and a central projection 50 of stop 19 for adjusting the proper angle $q_{Mi}$ or $q_{Ma}$.

Figure 7:
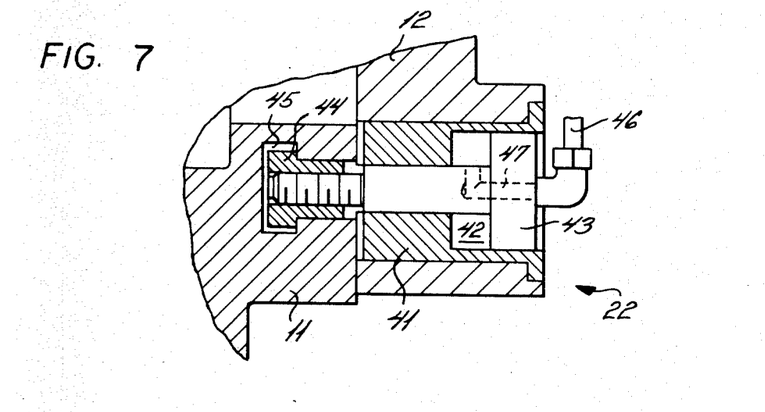
FIGS. 7 and 7a are sectional detail views taken along line 7—7 in FIG. 5.
Figure 7A:
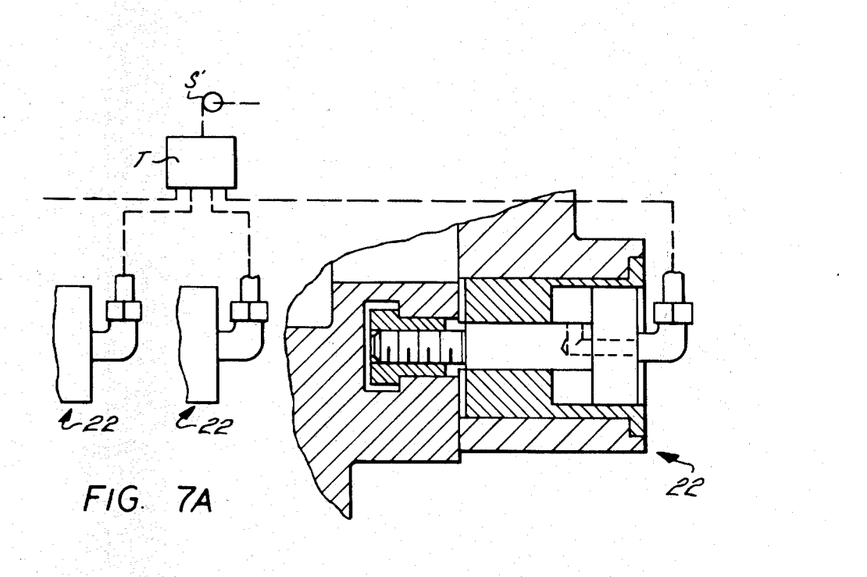

FIGS. 7, 7$a$ show the construction and control of fastening device 22. Swiveling part 12 has a bushing 41 press fitted therein, which is hollowed out so as to provide a hydraulic cylinder 42 therein, wherein a hydraulic piston 43 is shiftably received. One end of this piston has a T-shaped clamp member 44 thereon, which is received in T-shaped groove 45 in drum 11. Hydraulic duct 46 in piston 43 admits oil under pressure, from source S controlled at T, through ducts 47, into hydraulic cylinder 42 to force the piston outwardly and thereby to force pressure element 44 against the shoulder in groove 45 and thus to hold part 12 to drum 11.

As further shown in FIG. 5, a scale 48 is provided on cradle 9, opposite null mark 49 on toll holder 3, for the reading of cradle angle $q_w$ (FIG. 2).

In FIG. 8, the feeding motor 68 for forward rolling is in geared connection over a shaft 69, a pair of gear wheels 70, 71, a shaft 72, and another pair of gears 73, 74 with the connection shaft 75 arranged in the traverse 8. Similar to the foregoing is the geared connection with the quick traverse motor 76 for backward rolling and the connection shaft 75 over a shaft 77, a pair of gears 78, 79, a shaft 80, and a pair of gears 81, 74. The gears 73, 81 are mounted for rotation on the shafts 72, 80 and are in operative connection with the couplings 82, 83 secured on shafts 72, 80. Gear wheel 74 as well as a brake coupling 84 are fixedly mounted on the connection shaft 75. The couplings 82, 83 as well as the brake coupling 84 are preferably electromagnetic couplings.

Figure 3B:
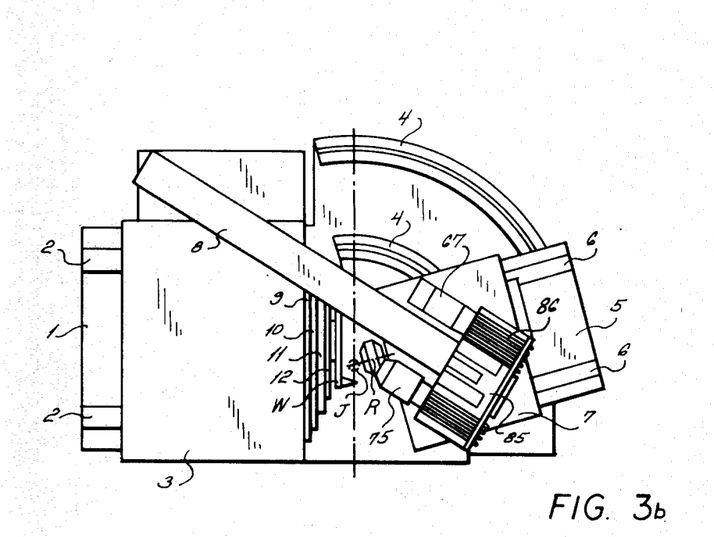
FIG. 3b is a plan view of the new machine.

The gear elements associated with the motors 68 and 76 for their geared connection with the connection shaft 75 are arranged in a gear case 85 provided with cooling fins 86, as shown in FIGS. 3, 3a and 3b.

The driving path for the rolling gear train runs from connection shaft 75 over a pair of bevel gears 87, 88, shaft 89 mounted vertically in the workpiece stand 7, the pair of bevel gears 90, 91, shaft 92, roll change gears 93, 94, shaft 95, roll change gears 96, 97, shaft 98, a pair of gears 99, 100, and shaft 101 over a differential gear with the indexing mechanism 102 to shaft 103, and over index change gears 107, 108 and shaft 109 to worm 110 which transmits the rotary movement to worm gear 112 rigidly connected with work spindle 11. The rotary movement of connection shaft 75 is furthermore transmitted over a pair of bevel gears 113, 114, shaft 115 mounted vertically in tool stand 3, and worm 116 to worm ring gear 117, so that the gear connection between cradle 9 and work spindle 111 is established.

The pair of bevel gears 113, 114 is received by a bearing (not shown), which is secured on tool stand 3, bevel gear 113 being arranged on connection shaft 75 nonrotatably, but for axial movement in order to permit the horizontal displacement of tool stand 3.

The engagement and disengagement of the couplings 82, 83 is effected within the framework of a well known program control, which is therefore not represented here, by actuating switches 118, 119, to which are assigned cams 120, 121, which are secured on cradle 9 and which can be adjusted in their distance from the switches 118, 119.

The method of operation of the aforementioned gear train within the framework of the automatic working cycle shown in FIGS. 1a to 1d is as follows:

After all necessary adjustment operations on the machine are completed, and the tool and workpiece are in the position necessary for carrying out the gear cutting process, the forward rolling movement is started. To this end coupling 82 is connected with gear wheel 83 within the framework of a customary program control and the driving path extends from feed motor 68 over the pairs of gear wheels 70, 71 and 73, 74 to connection shaft 75, so that the gear train is driven at the feeding rate. Cradle 9 and with it the cutter head W thus move from the starting position A for forward rolling in the direction of the rolling end position B (FIGS. 1, 1a and 1b). As soon as cam 120 strikes switch 118, the geared connection between feed motor 68 and connection shaft 75 is interrupted by separating coupling 82 from gear wheel 83, and the forward rolling movement is thus completed. The rolling end position B has been reached.

After the completion of the swivel movement of the expanding cutter head W' about the swivel axis S (FIGS. 1b and 1c), where the starting position C for backward rolling is reached (FIGS. 1 and 1c), the backward movement is started, again within the framework of the program control.

To this end, coupling 83 is connected with gear wheel 81, so that the driving path extends from the quick traverse motor 76 over the pairs of gear wheels 78, 79 and 81, 74 to the connection shaft 75, and the gear train is driven at the quick traverse rate. Cradle 9, and with it the cutter head W''', thus move from the starting position C for the backward rolling in the direction of the rolling end position D (FIGS. 1, 1c and 1d). The backward rolling can therefore be effected at the quick traverse rate, since only a small amount of residual material has to be removed on the concave tooth flank Fa (FIGS. 1a to 1d). As soon as cam 121 strikes switch 119, the geared connection between the quick traverse motor 76 and the connection shaft 75 is interrupted by separating the coupling 83 from the gear 81, and the backward rolling movement thus starts. The rolling end position D has been reached. At the same time the brake coupling 84 begins to act. The further sequence of operations has already been described in connection with the description of FIGS. 1a to 1d.

DESCRIPTION OF THE METHOD OF OPERATION OF THE MACHINE

The required positions and values are determined for the workpiece in hand, with the aid of a suitable calculation manual. In accordance therewith, the machine then is adjusted so that the tool and the workpiece have the proper mutual positions for carrying out the pitch generating method.

For adjustment of eccentricity $e$ radial slide 10 is shifted until the null mark 24 thereon coincides with the desired value on scale 23 of the cradle. The distance between the cradle axis O and the initial middle position of the cutter head axis M (FIG. 5) corresponds with the desired eccentricity $e$. Cradle 9 then is adjusted by swiveling it about cradle axis O to such extent that the straight line G (FIGS. 5 and 2) includes the cradle angle $q_w$ with momentary axis X, so that null mark 49 on tool holder 3 lies opposite the desired value on scale 48. At the same time, swiveling axis S must be in a predetermined position relative to straight line G, establishing swivel angle $q_S$. This angle is adjusted by swivel drum 11 about its axis M' (coinciding with middle position of cutter head axis M) until the scale value corresponding to the swivel angle lies opposite null mark 26 on radial slide 10.

Thereafter, as indicated by FIG. 6, the middle offset angles $q_{Ma}$ are adjusted. This is done while fastening devices 22 and 36, 37 are loosened. A gauge block 40 corresponding to the proper angle $q_{Ma}$ for generating concave flank Fa is inserted between measuring bolt 38 and bolt 50 on stop 19. At this time screw thread 34 of adjustable stop 20 is threaded out to such extent that the fixed stop 19 is placed against the threaded spindle 34 by the action of hydraulic piston 28, while sufficient room remains between measuring bolts 38 and 50 for easy insertion of gauge block 40. For exact adjustment of angle $q_{Ma}$, spindle 38 is slowly threaded back until gauge block 40 can just be pulled out with sliding motion between bolts 50 and 38. In the position so established, threaded spindle 34 of adjustable stop 29 is fastened by clamping device 36. In the same way, spindle 38 is operated to adjust the machine for proper angle $q_{Mi}$ for generation of convex flank Fi.

It will be seen that by these operations the two positions of the cutter head axis are adjusted in accordance with the geometry of FIG. 2. According to the invention, the swivel axis S about which the cutter head is swiveled from one position of its axis $Mi$ to the other, $Ma$, lies parallel to cutter head axis $Mi$, and lies on a straight line which forms a predetermined swivel angle $q_s$ with straight lines through the cutter head axis and the cradle axis. The invention can be used for a machine with an inclinable cutter head axis, by suitable tilting of the swivel drum 11, for performing the new method in the hobbing of bevel pinions of different bevel angles. Axis S is, at the same time, a swivel axis for swiveling part 12, and an axis for the drive pinion for the cutter head drive gear 15, FIG. 4.

It will now be appreciated that the new mechanism is considerably simpler than the former devices for introduction of additional motion into the generating drive, which formerly usually required the use of change gears for changing the magnitude of the added motion, and of a reversible gear drive for each reversal from right hand to left hand skew angle. Due to these and other complexities of former drives, the safe functional cooperation of the machine elements was questionable in earlier devices. In these and other respects also regarding the economy of the devices for generation of the different motions, the new structure of FIGS. 4 and 5 is believed to be vastly superior to the earlier ones.

Pursuant to arrangement for the aforementioned machine adjustments in accordance with the invention, the further operation is simple. Pinion R is inserted as shown in FIGS. 3, 3a and 3b. The proper bevel angle is adjusted by swiveling sled 5 with workpiece holder 7 thereon, on guides 4 of bed 1. Pinion R is thus brought into proper working condition relative to the expanding head W, subject to consideration of the further well known parameters.

In the actual hobbing operation, the axis $Mi$ of cutter head W has initial position A according to FIG. 1, and hydraulic piston unit 29, FIG. 4, presses fixed stop 19 of swiveling part 11 against the adjusted thread spindle 35 of adjustable stop 21. In the so-defined initial position A, swiveling part 12 is fastened to swivel drum 11 by clamping devices 22.

Pursuant to actuation (automatically, if desired), workpiece holder 7 is brought into proper position of workpiece R relative to axis J; cutter head W begins to swivel by angle $_w$ about cradle axis O, while pinion R, driven via traverse 8, rotates about its axis, producing suitable generating motion relative to cutter head W and generating convex flank $Fi$ in forward generating from initial position A to position B. In the latter position, the clamp devices 22 are automatically released; swiveling part 12 with fixed stop 19 is automatically tilted about swivel axis S, by operation of hydraulic piston units 28, until fixed stop 19 contacts threaded spindle 34. Admission of hydraulic fluid into cylinder 42 moves piston 43 toward right, FIGS. 7, 7a. Clamping of swiveling part 12 to swivel drum 11 is thus effected in initial position C for backward generating. In the meantime, the generating motion between cutter head W and pinion R has been reversed by proper operation of the generating feed drive. Renewed generating motion between cutter head W'' and pinion R causes backward generating motion from C to D to generate concave flank $Fa$ and at the same time to cut an outwardly expanding tooth space Z into the workpiece. In end position D cylinder units 42 of clamps 22 are newly released; swiveling part 12 with fixed stop 19 is newly swiveled in opposite direction, about swivel axis S, until the fixed stop contacts threaded spindle 35. With this generating motion at the same time the required turning of pinion R is effected for cutting the next tooth space. Part 12 again is clamped to drum 11 and the machine is in position for forward generating motion for the hobbing of the next tooth space.

While the operation has been described as performed for the purpose of rough hobbing, it can also be applied in finishing operations and other modifications of the specific disclosure within the spirit of the invention and obvious to one skilled in the art.

What is claimed is:

1. In the rolling method for producing spiral and hypoid bevel gears wherein a cradle supported in a tool holder is rotatable about a cradle axis and supports a spread blade cutter head rotatable about a cutter axis spaced from and parallel to the cradle axis and together with the cutter moves in one rolling direction relative to the tool holder and to the turning work piece to cut one tooth flank of a tapering tooth gap and moves in the opposite rolling direction relative to the tool holder and to the turning work piece to cut the other tooth flank of the tapering tooth gap; the improvement in that the work cycle comprises:

cutting the one tooth flank by rolling the rotating cutter head in the first direction with a specific ratio of roll between the cradle and the workpiece so that the axis of the cutter head rolls from a first position along a first arcuate path about the cradle axis to a second position at the end of the first arcuate path;

then, swinging the rotating cutter head toward the other tooth flank about a swivel axis parallel to and offset from the axes of the cradle and cutter head so that the axis of the cutter head is swung to a third position, the second and third position of the cutter head axis lying along the path of a swivel arc generated about the swivel axis and also lying along an arc intersecting the swivel arc at the second and third positions of the cutter head axis and generated about an axis situated on the center line of the tapering tooth gap at the narrowest location thereof;

then, cutting the other tooth flank by rolling the rotating cutter head in the opposite direction with the same ratio of roll between the cradle and work piece so that the axis of the cutter head rolls from the third position to a final position along a second arcuate path spaced from and concentric with the first arcuate path;

then, in the final position of the cutter head, swinging the cutter head about the swivel axis to dispose the axis of the cutter head in the first position.

2. In a machine for producing bevel and hypoid gears having a tool holder, a cradle, means mounting said cradle in said tool holder for rotational movement about a cradle axis, a slide member, means mounting said slide member in said cradle for linear movement radially of the axis of said cradle, a spread blade cutter head, and means mounting said spread blade cutter head in said slide member for rotational movement about a cutter head axis parallel with and offset radially from the axis of said cradle, the improvement comprising further means mounting said cutter head in said slide member for swiveling movement of said cutter head about a swivel axis parallel with and radially offset from the axes of said cradle and of said cutter head.

3. A machine according to claim 2 wherein said further means mounting said cutter head comprises a drum, and said drum has a shaft rotatably mounted therein, the axis of said shaft coincides with the axis about which said swiveling member swivels, said shaft carries two gears connected with one another, one of the said gears meshing with a gear on the driving shaft of the machine and the other of said gears meshing with a gear on the cutter head.

4. In the machine of claim 2 further having a workpiece holder and wherein said tool holder is supported by means mounting the same for horizontal movement relative to said workpiece holder, said workpiece holder providing means for holding bevel and hypoid gear blanks, said workpiece holder being supported upon means for horizontal movement relative to said means mounting said tool holder, means connecting said means mounting said tool holder and said means mounting said workpiece holder, said connecting means constituting means for controlling the relative movement between said tool holder and said workpiece holder.

5. In the machine of claim 2, wherein said means mounting said cutter head in said slide member for swiveling movement thereof includes a drum supported in said slide member and a swiveling member supported by said drum, said cutter head being supported in said swiveling member, the latter being mounted for swiveling about the swivel axis.

6. A machine according to claim 2 wherein said cradle has a scale on its face thereof, said slide has a null mark on its face thereof, said null mark being in facing relationship to said slide.

7. A machine according to claim 4 wherein said tool holder has a tool holder null mark marked thereon disposed in facing relationship with a cradle scale disposed on said cradle.

8. In the machine of claim 4 wherein said means mounting said tool holder for horizontal movement constitutes track means for moving said tool holder mounting means toward and away from said workpiece holder, and said means mounting said workpiece holder constitutes track means for moving said workpiece holder in an arcuate path about a vertical axis between said tool holder and said workpiece holder.

9. A machine according to claim 5 wherein said swiveling member is affixed to said drum by clamping devices disposed on the face of said swiveling member.

10. A machine according to claim 5 wherein said drum has secured thereto at least one swivel mechanism comprising a hydraulic piston disposed in a hydraulic cylinder, said piston engaging said swiveling member, a reservoir containing a hydraulic cylinder via ducts through which hydraulic fluid can pass and means for passing said hydraulic fluid from said reservoir into said cylinder and means for withdrawing fluid from said cylinder.

11. A machine according to claim 5 wherein there are a pair of said swivel mechanism devices generally disposed on opposed sides of said swiveling member.

12. In the machine of claim 5, wherein there are provided stop means on said drum and swiveling member for limiting the swiveling movement of said cutter head about the swivel axis.

13. A machine according to claim 12 wherein said stop means comprises a pair of facing abutments on said drum separated by a gap, said swiveling member having a stationary stop protruding through said gap.

14. A machine according to claim 13 wherein in said gap there are a pair of measuring bolts fastened to and protruding from said drum, said stationary stop has a measuring stop protruding therefrom to define a measuring gap between said measuring bolt and said protruding stop.

15. A machine according to claim 9 wherein said swiveling member has an aperture therein containing a clamping device, said clamping device comprises a bushing press fitted into said aperture, and having a hydraulic cylinder therein, said hydraulic cylinder having a hydraulic piston head carried on a shaft and disposed therein, said shaft terminating in a generally T-shaped clamp member housed in a generally T-shaped recess defined by walls in said drum, said piston head and said shaft having a hydraulic fluid feed line therein terminating at one end exterior of said swiveling member and at the other end terminating in said cylinder, a source of hydraulic fluid and means for passing said fluid under pressure through said hydraulic fluid feed line, through said piston head and into said cylinder whereby to force the piston head outwardly toward the face of said swiveling member and to thereby urge said T-shaped clamp member against the walls of said recess whereby to draw said drum and said swiveling member together.

* * * * *